United States Patent
Taylor et al.

(10) Patent No.: US 12,386,066 B1
(45) Date of Patent: Aug. 12, 2025

(54) SMALL SIGNAL DETECTION FILTER

(71) Applicant: Furuno Electric Co., Ltd., Nishinomiya (JP)

(72) Inventors: Matthew Clive Taylor, Auckland (NZ); Shinya Tanimura, Auckland (NZ)

(73) Assignee: FURUNO ELECTRIC CO., LTD., Nishinomiya (JP)

( * ) Notice: Subject to any disclaimer, the term of this patent is extended or adjusted under 35 U.S.C. 154(b) by 59 days.

(21) Appl. No.: 18/426,383

(22) Filed: Jan. 30, 2024

(51) Int. Cl.
*G01S 15/04* (2006.01)

(52) U.S. Cl.
CPC .................................... *G01S 15/04* (2013.01)

(58) Field of Classification Search
None
See application file for complete search history.

(56) References Cited

U.S. PATENT DOCUMENTS

| | | | | |
|---|---|---|---|---|
| 4,765,714 A * | 8/1988 | Horner | ................ | G06V 10/895 359/561 |
| 5,046,504 A * | 9/1991 | Albert | ...................... | A61B 5/35 600/509 |
| 5,291,560 A * | 3/1994 | Daugman | ............... | G06F 21/32 382/222 |
| 5,353,233 A * | 10/1994 | Oian | ...................... | G01R 23/16 702/76 |
| 5,852,567 A * | 12/1998 | Xia | .................... | H04L 27/0004 702/76 |
| 6,332,116 B1 * | 12/2001 | Qian | ...................... | G01H 1/003 702/182 |
| 6,366,862 B1 * | 4/2002 | Qian | ...................... | G01H 1/003 702/182 |
| 6,507,798 B1 * | 1/2003 | Salvino | ................. | G06F 17/141 702/66 |
| 6,590,833 B1 * | 7/2003 | Teller | .................... | G01S 3/8083 367/901 |
| 6,810,341 B2 * | 10/2004 | Qian | ...................... | G01H 1/003 702/182 |
| 7,127,072 B2 * | 10/2006 | Rademacher | ....... | G10L 21/0208 381/94.1 |
| 8,923,530 B2 * | 12/2014 | Diethorn | ................. | H04M 1/62 379/406.01 |
| 10,302,687 B2 * | 5/2019 | George | ...................... | G06F 3/05 |
| 11,567,196 B2 * | 1/2023 | Taudien | ................. | G01S 15/58 |
| 2023/0213613 A1 * | 7/2023 | Carswell | ................ | G01S 7/288 342/195 |

* cited by examiner

*Primary Examiner* — Fekadeselassie Girma
(74) *Attorney, Agent, or Firm* — XSENSUS LLP

(57) ABSTRACT

A sonar device including reception circuitry and processing circuitry is disclosed. The reception circuitry acquires sonar data from one or more targets in an underwater environment. The processing circuitry includes a target detector, a first noise filter, a second noise filter, and a selector. The target detector generates a binary mask that indicates presence or absence of target based on the sonar data. The first and second noise filters receive the sonar data, perform first and second noise filtering on the sonar data to reduce noise in the sonar data respectively, and output first and second filtered sonar data respectively. The first noise filtering is based on a first threshold. The second noise filtering is based on a second threshold different from the first threshold. The selector selects one of the first filtered sonar data and the second filtered sonar data as output based on the binary mask.

19 Claims, 5 Drawing Sheets

SMALL SIGNAL DETECTION FILTER

TECHNICAL FIELD

The present disclosure relates to sonar devices, and more specifically to a small signal detection filter of the sonar devices.

BACKGROUND

Sonar systems play an important role in underwater detection, but they face challenges due to absorption and spreading losses that result in system noise, thereby compromising the quality of detection. The interference of system noise becomes even more pronounced in multibeam sonar systems, where signal sidelobes pose additional hurdles. Sidelobes, particularly in multibeam sonar systems, can significantly hinder the accuracy of target detection across various ranges.

Sidelobes are often suppressed for user displays to prevent confusion caused by irrelevant signals. This is particularly valuable in the context of two dimensional (2D) or three dimensional (3D) sonar information, where sidelobes may appear as artifacts of a target that is otherwise clearly detectable elsewhere in the display.

The challenge with sidelobes lies in their variability, both in terms of signal characteristics and their distribution across the angular horizon. While it is possible to estimate the peak level of sidelobes through measurement, determining the exact value at a specific azimuth angle proves challenging. Consequently, sidelobe filters often make a mistake on the side of over-filtering the data.

In addition to sidelobes, noise in sonar systems follows a distribution pattern, with a significant portion being filterable through a slight adjustment in signal thresholding. However, achieving noise removal becomes progressively difficult, requiring a threshold much higher than the point where 50% of the display is noise. Lowering the detection threshold to identify smaller objects introduces the risk of an increasing number of false-positive noise targets, potentially rendering the detection impractical.

Moreover, sonar target signals, which often span multiple samples and exhibit varying signal levels, face distortion when near the sidelobe or noise detection limits. This distortion is attributed to the relevant sidelobe or noise filter processes, particularly when the targets are close to these limits.

In light of the foregoing, there is a need for providing a technical solution that overcomes the challenges and shortcomings of conventional sonar systems.

SUMMARY

In an embodiment of the present disclosure, there is provided a sonar device comprising reception circuitry and processing circuitry. The reception circuitry is configured to acquire sonar data from one or more targets in an underwater environment. The processing circuitry comprises a target detector, a first noise filter, a second noise filter, and a selector. The target detector is configured to generate a binary mask that indicates presence or absence of target based on the sonar data. The first noise filter is configured to receive the sonar data, perform first noise filtering on the sonar data to reduce noise in the sonar data, and output first filtered sonar data. The first noise filtering is based on a first threshold. The second noise filter is configured to receive the sonar data, perform second noise filtering on the sonar data to reduce noise in the sonar data, and output second filtered sonar data. The second noise filtering is based on a second threshold different from the first threshold. The selector is configured to receive the first filtered sonar data and the second filtered sonar data and select one of the first filtered sonar data and the second filtered sonar data as output based on the binary mask.

Additionally, or optionally, the first threshold and the second threshold may be greater than a background noise level of the sonar data and the first threshold may be greater than the second threshold. The selector may be configured to select the first filtered sonar data as output when the binary mask indicates the absence of target and select the second filtered sonar data as output when the binary mask indicates the presence of target.

In another embodiment of the present disclosure, there is provided a sonar method. The sonar method includes acquiring sonar data from one or more targets in an underwater environment, generating a binary mask that indicates presence or absence of target based on the sonar data, and performing first noise filtering on the sonar data to reduce noise in the sonar data and outputting first filtered sonar data. The first noise filtering is based on a first threshold. The sonar method further includes performing second noise filtering on the sonar data to reduce noise in the sonar data and outputting second filtered sonar data. The second noise filtering is based on a second threshold different from the first threshold. The method further includes selecting one of the first filtered sonar data and the second filtered sonar data as output based on the binary mask.

In yet another embodiment of the present disclosure, there is provided a non-transitory computer-readable storage medium having stored thereon machine-readable instructions which, when executed by one or more processors of an apparatus, cause the apparatus to perform a method including acquiring sonar data from one or more targets in an underwater environment, generating a binary mask that indicates presence or absence of target based on the sonar data, performing first noise filtering on the sonar data to reduce noise in the sonar data and outputting first filtered sonar data, the first noise filtering being based on a first threshold, performing second noise filtering on the sonar data to reduce noise in the sonar data and outputting second filtered sonar data, the second noise filtering being based on a second threshold different from the first threshold, and selecting one of the first filtered sonar data and the second filtered sonar data as output based on the binary mask.

The sonar device provides solutions to the challenges faced by sonar systems by enhancing the detection and display of sonar signals. The sonar device reduces the filtering of genuine sonar targets while maintaining effective filtration of unwanted signals such as sidelobes and noise, thus optimizing the accuracy and reliability of target detection. Unlike conventional approaches that risk distorting sonar target signals near detection limits, the disclosed sonar device filters the sonar data, ensuring that real sonar targets are preserved without compromising the clarity of the display, thus, minimizing the interference caused by system noise and sidelobes and empowering users with a more accurate representation of underwater environments.

BRIEF DESCRIPTION OF DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DETAILED DESCRIPTION OF THE EMBODIMENTS

Figure 1:
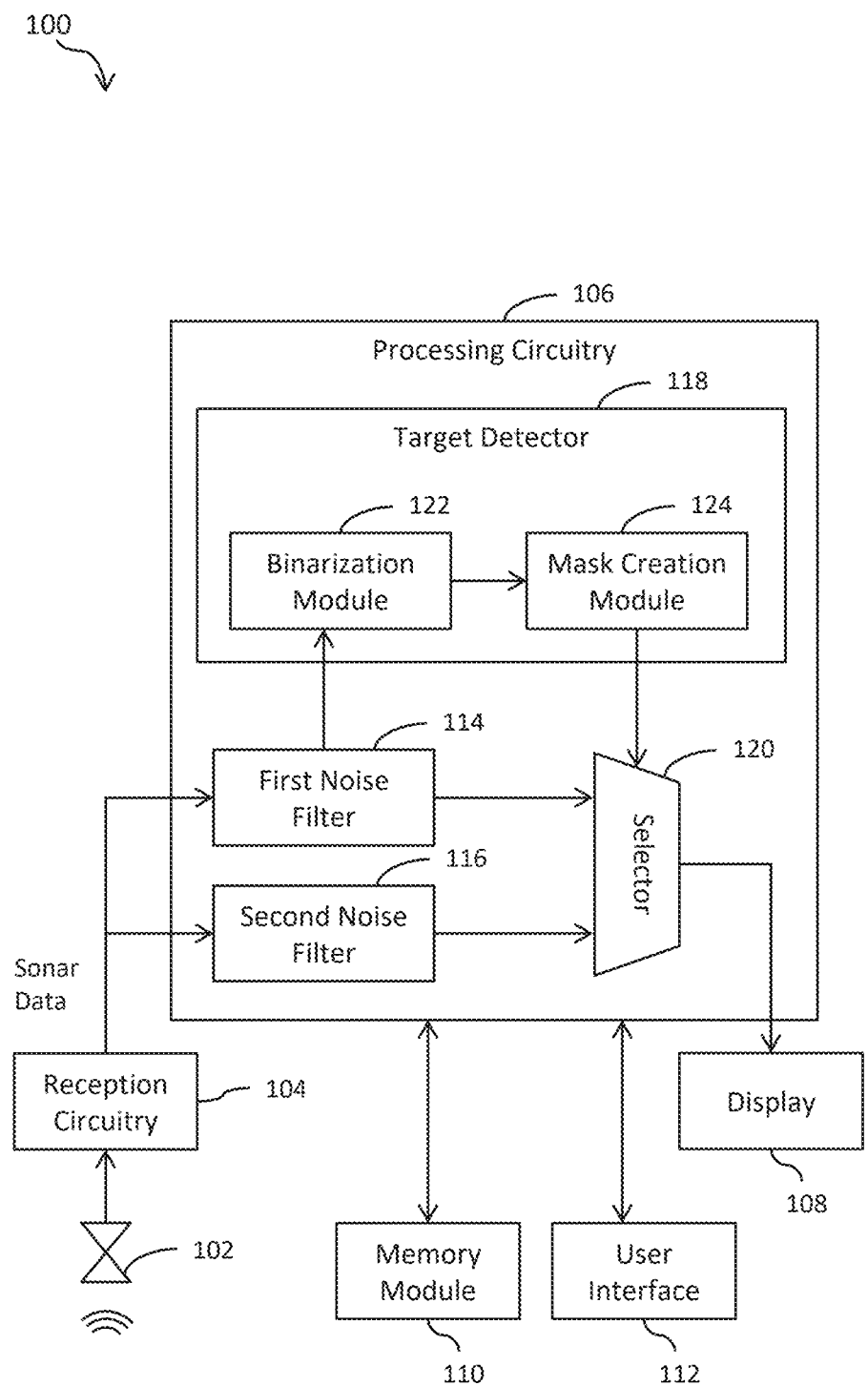
FIG. 1 is a schematic diagram that exemplarily illustrates a sonar device, in accordance with an example embodiment.

Example apparatus are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

FIG. 1 is a schematic diagram that exemplarily illustrates a sonar device 100, in accordance with an example embodiment. In an example embodiment, the sonar device 100 is installed in a mobile structure (not shown). The mobile structure may be a vessel navigating over a water body. The water body may comprise a sea, an ocean, a river, or the like. In an example embodiment, the sonar device 100 is deployed to detect and identify targets, such as submarines, mines, fishes, fish schools, and the like. In another embodiment, the sonar device 100 is deployed to detect a potential shoal hazard ahead of the mobile structure. In an embodiment, the sonar device 100 may be used during offshore monitoring without the presence of the mobile structure. In an example, the mobile structure may correspond to a ship, a boat, or the like. In general, the sonar device 100 is configured to detect and determine distance and direction of underwater objects with respect to the sonar device 100 by use of acoustic means. For example, sound waves emitted by the sonar device 100 and reflected sound waves from the object are detected and analyzed by the sonar device 100. In an exemplary embodiment, the sound waves may be ultrasonic waves.

The sonar device 100 is configured to transmit the ultrasonic waves in the water body. The sonar device 100 receives reflected ultrasonic waves from one or more objects (e.g., the targets) in the water body and generates a reception signal based on the reflected ultrasonic waves. In general, the ultrasonic waves correspond to inaudible sound waves with a high frequency (generally exceeding 20 kHz). In an embodiment, the sonar device 100 transmits the ultrasonic waves and further generates the reception signal by detecting the ultrasonic waves after they reflect from the one or more objects in the water body. In addition, a plurality of reception beams may be generated based on the reception signal for target detection.

The sonar device 100 includes a transducer 102, reception circuitry 104, and processing circuitry 106. Further, the sonar device 100 may include a display 108, a memory module 110 (also referred to hereinafter as memory), and a user interface 112.

The transducer 102 receives a transmission signal. The transducer 102 may include a plurality of transducer elements. The plurality of transducer elements corresponds to ultrasonic transducer elements such as an array of piezoelectric crystals. The transducer 102 transforms the transmission signal into the ultrasonic waves. The transducer 102 is configured to transmit the ultrasonic waves (ultrasonic transmission waves) in a wide transmission beam in the water body, such as a sea. The ultrasonic waves may be transmitted towards a seafloor of the water body or the sea. The ultrasonic waves travel through the water body and get reflected back after striking the one or more objects, such as the seafloor or targets that may be in the water body. Each of the plurality of transducer elements of the transducer 102 may be configured to receive the ultrasonic waves (ultrasonic reflection waves) reflected from the one or more objects in the water body corresponding to a reflection of the ultrasonic transmission wave on an underwater object in the underwater environment. Further, each transducer element of the transducer 102 is configured to generate a return signal based on the reflected ultrasonic waves and the transducer 102 provides the return signals to the reception circuitry 104.

The reception circuitry 104 receives the return signals and generates sonar data based on the return signals. In other words, the reception circuitry 104 acquires the sonar data from one or more targets in an underwater environment. In one embodiment, the reception circuitry 104 acquires the sonar data from at least one reception beam. In this scenario, the sonar data are extending in at least one dimension corresponding to a distance of the one or more targets from the sonar device 100. In another embodiment, when the sonar device 100 is a muti-beam sonar device, the reception circuitry 104 acquires the sonar data from a plurality of reception beams for each ping (i.e., for each transmission). In this scenario, the sonar data are at least two-dimensional data where a first dimension of the at least two-dimensional data corresponds to the plurality of reception beams and a second dimension of the at least two-dimensional data corresponds to a distance of the one or more targets from the sonar device 100. Further, the reception circuitry 104 provides the sonar data to the processing circuitry 106.

The processing circuitry 106 includes a first noise filter 114, a second noise filter 116, a target detector 118, and a selector 120. The first noise filter 114 receives the sonar data and performs a first noise filtering on the sonar data to reduce noise in the sonar data. The first noise filter 114 outputs first filtered sonar data. The first noise filtering is based on a first threshold. The first threshold is greater than a background noise level of the sonar data. In one embodiment, the sonar data received by the first noise filter 114 is compared with the first threshold to generate the first filtered sonar data. If the sonar data is above the first threshold, the sonar data may go through the first noise filter 114 as is, and if the sonar data is below the first threshold, the first noise filter 114 may output zero.

The second noise filter 116 receives the sonar data and performs a second noise filtering on the sonar data to reduce noise in the sonar data. The second noise filter 116 outputs second filtered sonar data. The second noise filtering is based on a second threshold different from the first threshold. The second threshold is greater than the background noise level of the sonar data. In one embodiment, the sonar data received by the second noise filter 116 is compared with the second threshold to generate the second filtered sonar data. If the sonar data is above the second threshold, the sonar data may go through the second noise filter 116 as is, and if the sonar data is below the second threshold, the second noise filter 116 may output zero. In one embodiment, the first noise filtering and the second noise filtering may be performed using the same technique. In another embodiment, the first noise filtering and the second noise filtering may be performed using different techniques.

In one embodiment, the first threshold is greater than the second threshold. In this embodiment, the first filtered sonar data is used as input to perform target detection in the target detector 118. In an example, the first threshold is set at 16 decibels (dB) above the background noise level and the second threshold is set at 8 dB above the background noise level.

The target detector 118 performs target detection based on the sonar data. In one embodiment, the target detector 118 performs target detection based on the first filtered sonar data. The target detector 118 includes a binarization module 122. The binarization module 122 performs binarization of the first filtered sonar data to generate binary data. To perform binarization, each sample of the first filtered sonar data that is greater than zero is converted to binary logic 1 and each sample of the first filtered sonar data that is equal to zero is converted to binary logic 0. The binary data is of the same dimension as the first filtered sonar data, i.e., the binary data are at least one dimensional data including a plurality of bits (hereinafter also referred to as flags) that are logic 1 or logic 0 based on the binarization performed on the first filtered sonar data. A logic 1 corresponds to a presence of detected target whereas a logic 0 corresponds to an absence of detected target.

The target detector 118 may further include a mask creation module 124. The mask creation module 124 may receive the binary data from the binarization module 122 and generate a binary mask that indicates presence or absence of target. To generate the binary mask, the mask creation module 124 may expand a position marked as presence of detected target in the binary data in one or more dimensions. In other words, the mask creation module 124 identifies each flag of the binary data which is at logic 1 and converts all the flags adjacent to the identified flag in one or more dimensions to logic 1. In one embodiment, if the binary data is a one-dimensional data, the flags adjacent to the identified flag at position X in the one-dimensional data (i.e., all the flags between X+x and X−x, x being an integer ≥0) are converted to logic 1. In another embodiment, if the binary data is a two-dimensional data, the flags adjacent to the identified flag at position X, Y in the two-dimensional data (i.e., all the flags between X+x and X−x, and all the flags between Y+y and Y−y, x & y being integers 0) are converted to logic 1. In yet another embodiment, if the binary data is a three-dimensional data, the flags adjacent to the identified flag at position X, Y, Z in the three-dimensional data (i.e., all the flags between X+x and X−x, all the flags between Y+y and Y−y, and all the flags between Z+z and Z−z, x, y & z being integers 0) are converted to logic 1. It will be understood by a person skilled in the art that a degree of mask expansion about targets may be calibrated to a system detection resolution and system performance. In one example, the degree of mask expansion may be one (i.e., x=1, y=1, z=1), such that one flag each adjacent to the identified flag in each dimension is converted to logic 1. In another example, the degree of mask expansion may be two (i.e., x=2, y=2, z=2), such that two flags each adjacent to the identified flag in each dimension are converted to logic 1. In another example, the degree of mask expansion may be three or more. In yet another example, the degree of mask expansion may be 0. In this case, there is no expansion of a position marked as presence of detected target in the binary data. It is to be noted that the degree of mask expansion does not need to be the same in all directions, and therefore, there may be more expansion in one dimension than in another.

A logic 1 at a position in the binary mask indicates the presence of target at that position. A logic 0 at a position in the binary mask indicates absence of target at that position. The expansion process of the mask creation module 124 may be referred to as blurring.

The selector 120 receives the first filtered sonar data and the second filtered sonar data as first and second inputs and the binary mask as a selection input. Based on the binary mask, the selector 120 selects one of the first filtered sonar data and the second filtered sonar data as the output. The selector 120 may select the first filtered sonar data as output when the binary mask indicates the absence of target and select the second filtered sonar data when the binary mask indicates the presence of target. In other words, the flags of the binary mask that are at logic 0 may be replaced with the corresponding data of the first filtered sonar data and the flags of the binary mask that are at logic 1 may be replaced with the corresponding data of the second filtered sonar data.

The display 108 may receive the output of the selector 120 and render the output on a display screen (not shown) to be viewed by a user or operator of the ship. Alternatively, the output of the selector 120 may be subject to further signal processing before being rendered on the display screen. The user interface 112 may be utilized by the user to configure parameters for filtering of the sonar data, such as setting the first and second thresholds for the first and second noise filters, setting the degree of mask expansion, and the like. The memory module 110 may store the configuration set by the user and the processing circuitry 106 may retrieve the stored configuration to perform the filtering of the sonar data.

The sonar device 100 thus provides solutions to the challenges faced by sonar systems by enhancing the detection and display of sonar signals. The sonar device 100 reduces the filtering of genuine sonar targets while maintaining effective filtration of unwanted signals such as sidelobes and noise, thus optimizing the accuracy and reliability of target detection. Unlike conventional approaches that risk distorting sonar target signals near detection limits, the disclosed sonar device filters the sonar data, ensuring that real sonar targets are preserved without compromising the clarity of the display, thus, minimizing the interference caused by system noise and sidelobes and empowering users with a more accurate representation of underwater environments.

Figure 2:
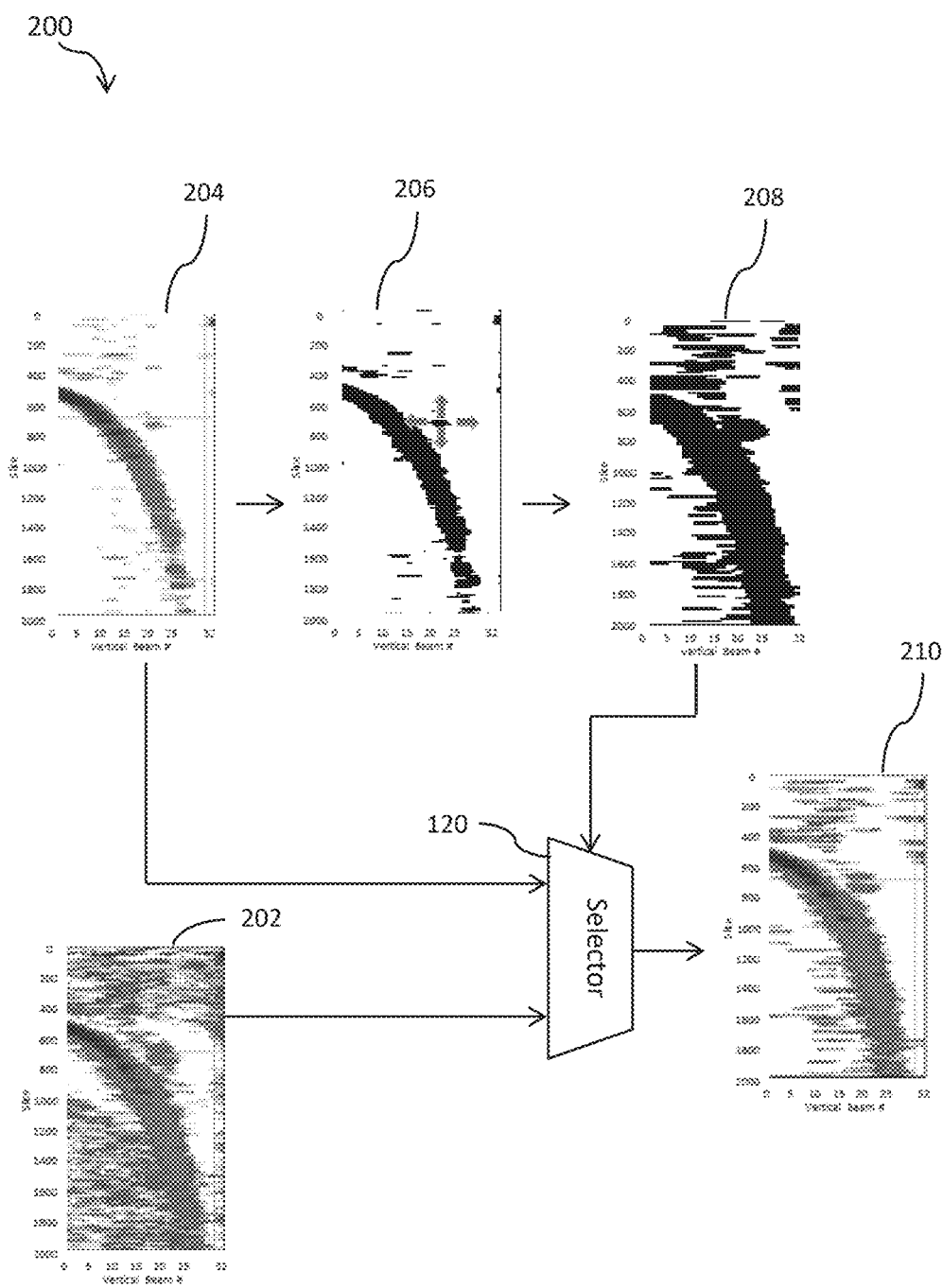
FIG. 2 illustrates an exemplary process of filtering sonar data by the sonar device of FIG. 1, in accordance with an example embodiment.

FIG. 2 illustrates an exemplary process of filtering sonar data by the sonar device 100, in accordance with an example embodiment. In this example embodiment, the sonar device 100 is a multi-beam sonar device and the sonar data are two-dimensional data, where a first dimension of the two-dimensional data corresponds to the plurality of reception beams of the multi-beam sonar and a second dimension of the two-dimensional data corresponds to the distance of target from the sonar. The first noise filter 114 receives the sonar data and generates the first filtered sonar data 204 (also referred to as high filter data in FIG. 2), in which the horizontal axis in FIG. 2 corresponds to the first dimension and the vertical axis corresponds to the second dimension. The second noise filter 116 receives the sonar data and generates the second filtered sonar data 202 (also referred to as low filter data in FIG. 2), in which the horizontal axis in FIG. 2 corresponds to the first dimension and the vertical axis corresponds to the second dimension. In this example embodiment, the first threshold of the first noise filter 114 is higher than the second threshold of the second noise filter 116. As a result, the low filter data includes more target details and noise than the high filter data, and the high filter data includes mainly target of interest. The binarization module 122 receives the first filtered sonar data 204 and performs binarization on the first filtered sonar data 204 to generate the binary data 206. The mask creation module 124 receives the binary data 206 and generates the binary mask 208. The selector 120 receives the first filtered sonar data 204, the second filtered sonar data 202, and the binary mask 208, and selects one of the first filtered sonar data 204 and the second filtered sonar data 202 based on the binary mask 208. When the binary mask 208 indicates absence of target, the first filtered sonar data 204 is selected and when the binary mask 208 indicates presence of target, the second filtered sonar data 202 is selected. The selector 120 provides the filtered output 210 to the display 108.

Figure 3:
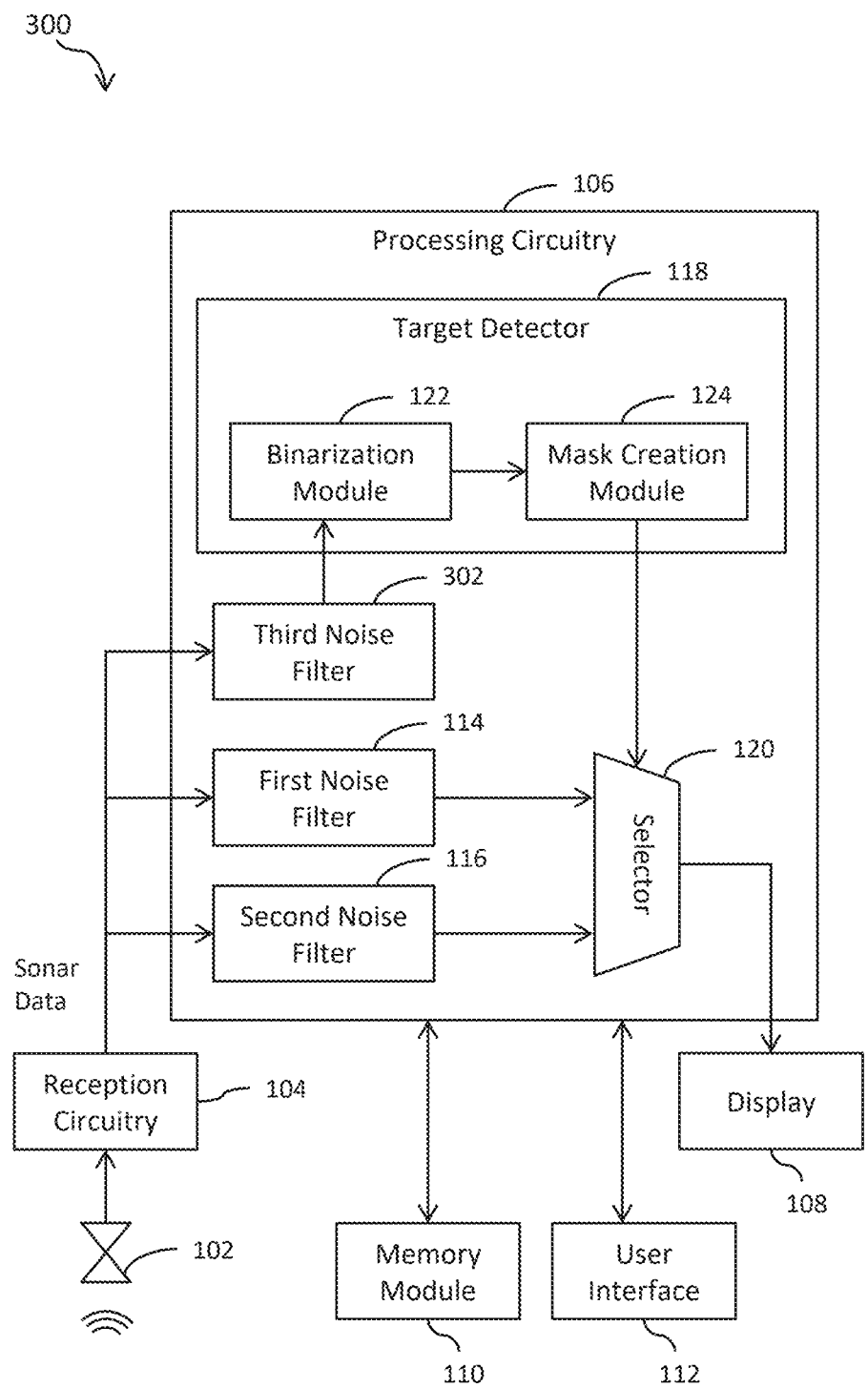
FIG. 3 is a schematic diagram that exemplarily illustrates a sonar device, in accordance with another example embodiment.

FIG. 3 is a schematic diagram that exemplarily illustrates a sonar device 300, in accordance with another example embodiment. The sonar device 300 includes the transducer 102, the reception circuitry 104, and the processing circuitry 106. Further, the sonar device 300 includes the display 108, the memory module 110 (also referred to hereinafter as memory), and the user interface 112. The transducer 102, the reception circuitry 104, the display 108, the memory module 110, and the user interface 112 function in similar manner as described in FIG. 1.

The processing circuitry 106 includes the first noise filter 114, the second noise filter 116, a third noise filter 302, the target detector 118, and the selector 120. The first noise filter 114 receives the sonar data and performs the first noise filtering on the sonar data to reduce noise in the sonar data. The first noise filter 114 outputs the first filtered sonar data. The first noise filtering is based on the first threshold. The first threshold is greater than the background noise level of the sonar data. In one embodiment, the sonar data received by the first noise filter 114 is compared with the first threshold to generate the first filtered sonar data. If the sonar data is above the first threshold, the sonar data goes through the first noise filter 114 as is, and if the sonar data is below the first threshold, the first noise filter 114 outputs zero.

The second noise filter 116 receives the sonar data and performs a second noise filtering on the sonar data to reduce noise in the sonar data. The second noise filter 116 outputs second filtered sonar data. The second noise filtering is based on a second threshold different from the first threshold. The second threshold is greater than a background noise level of the sonar data. In one embodiment, the sonar data received by the second noise filter 116 is compared with the second threshold to generate the second filtered sonar data. If the sonar data is above the second threshold, the sonar data goes through the second noise filter 114 as is, and if the sonar data is below the second threshold, the second noise filter 116 outputs zero.

The third noise filter 302 receives the sonar data and performs a third noise filtering on the sonar data to reduce noise in the sonar data. The third noise filter 302 outputs third filtered sonar data. The third noise filtering is based on a third threshold different from the first threshold and the second threshold. The third threshold is greater than the background noise level of the sonar data. In one embodiment, the sonar data received by the third noise filter 302 is compared with the third threshold to generate the third filtered sonar data. If the sonar data is above the third threshold, the sonar data goes through the third noise filter 302 as is, and if the sonar data is below the third threshold, the third noise filter 302 outputs zero. In one embodiment, the first noise filtering, the second noise filtering, and the third noise filtering may be performed using the same technique. In another embodiment, the first noise filtering, the second noise filtering, and the third noise filtering may be performed using different techniques.

In one embodiment, the first threshold is greater than the second threshold and the third threshold is greater than the second threshold. In this embodiment, the third filtered sonar data is used as input to perform target detection in the target detector 118.

The target detector 118 performs target detection based on the sonar data. In one embodiment, the target detector 118 performs target detection based on the third filtered sonar data. The target detector 118 includes the binarization module 122 and may include the mask creation module 124. The binarization module 122 performs binarization of the third filtered sonar data to generate binary data. To perform binarization, each sample of the third filtered sonar data that is greater than zero is converted to binary logic 1 and each sample of the third filtered sonar data that is equal to zero is converted to binary logic 0. The binary data is of the same dimension as the third filtered sonar data, i.e., the binary data are at least one-dimensional data including a plurality of bits (hereinafter also referred to as flags) that are logic 1 or logic 0 based on the binarization performed on the third filtered sonar data. A logic 1 corresponds to a presence of detected target whereas a logic 0 corresponds to an absence of detected target. The mask creation module 124 and the selector 120 function in a similar manner as described in FIG. 1.

Figure 4:
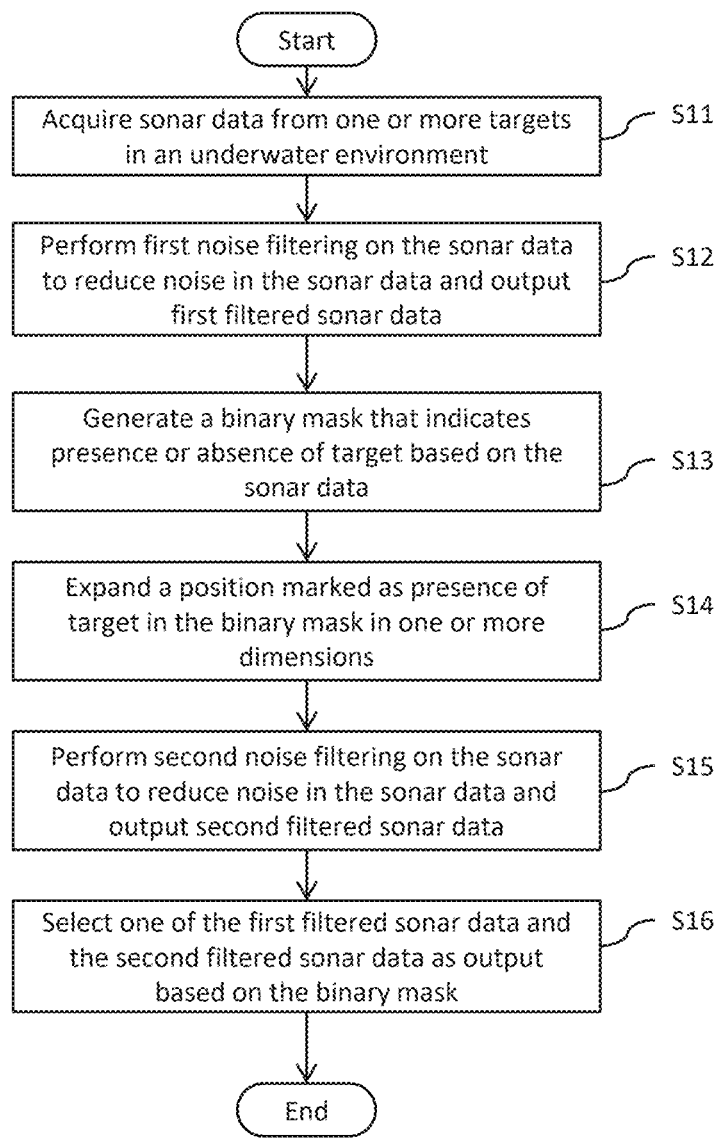
FIG. 4 is a flow chart illustrating a sonar method, in accordance with an example embodiment.

FIG. 4 is a flow chart illustrating a sonar method, in accordance with an example embodiment. At S11, the reception circuitry 104 receives the sonar data from one or more targets in the underwater environment. At S12, the first noise filter 114 of the processing circuitry 106 performs the first noise filtering on the sonar data to reduce noise in the sonar data and outputs the first filtered sonar data. The first noise filtering is based on the first threshold.

At S13, the processing circuitry 106 generates the binary mask that indicates presence or absence of target based on the sonar data.

At S14, the processing circuitry 106 may expand the position marked as presence of target in the binary mask in one or more dimensions. At S15, the second noise filter 116 of the processing circuitry 106 performs the second noise filtering on the sonar data to reduce noise in the sonar data and outputs the second filtered sonar data. The second noise filtering is based on the second threshold different from the first threshold.

At S16, the selector 120 of the processing circuitry 106 selects one of the first filtered sonar data and the second filtered sonar data as output based on the binary mask. When the binary mask indicates absence of target, the selector 120 may select the first filtered sonar data and when the binary mask indicates presence of target, the selector may select the second filtered sonar data as the output.

Figure 5:
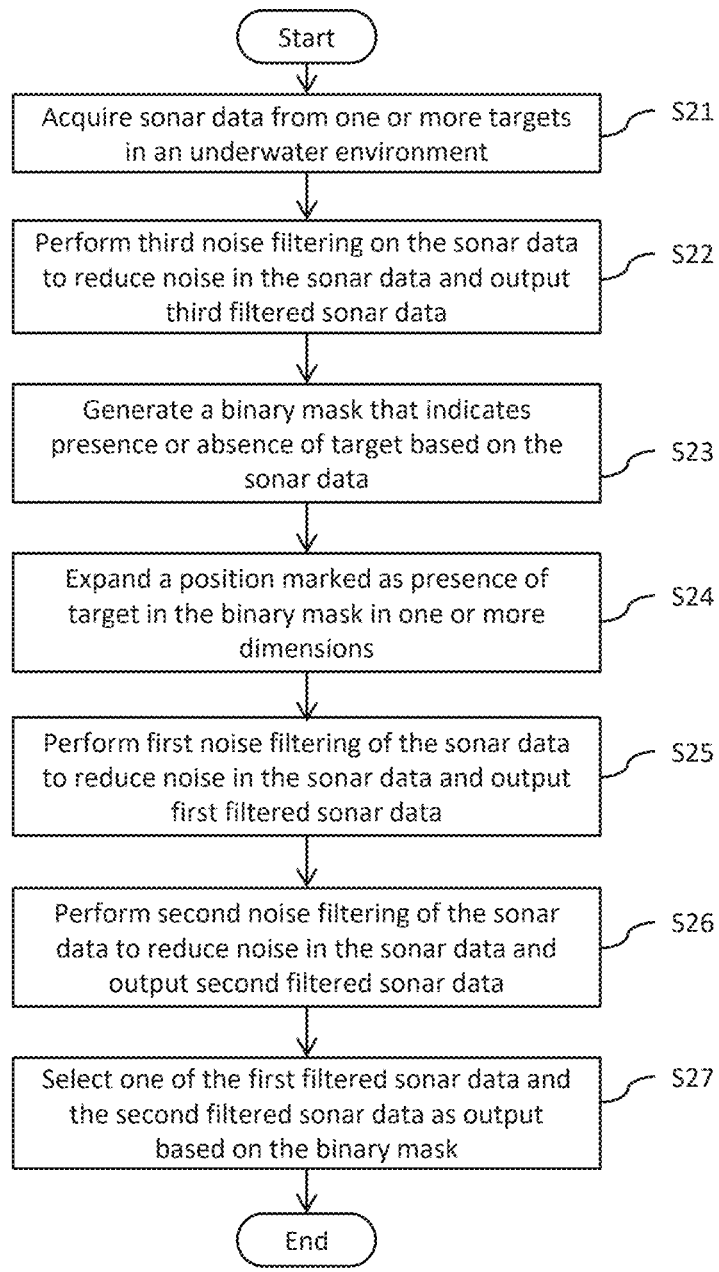
FIG. 5 is a flow chart illustrating a sonar method, in accordance with another example embodiment.

FIG. 5 is a flow chart illustrating a sonar method, in accordance with another example embodiment. At S21, the reception circuitry 104 receives the sonar data from one or more targets in the underwater environment. At S22, the third noise filter 302 of the processing circuitry 106 performs the third noise filtering on the sonar data to reduce noise in the sonar data and outputs the third filtered sonar data. The third noise filtering is based on the third threshold.

At S23, the processing circuitry 106 generates the binary mask that indicates presence or absence of target based on the sonar data.

At S24, the processing circuitry 106 may expand the position marked as presence of target in the binary mask in one or more dimensions. At S25, the first noise filter 114 of the processing circuitry 106 performs the first noise filtering on the sonar data to reduce noise in the sonar data and outputs the first filtered sonar data. The first noise filtering is based on the first threshold. At S26, the second noise filter 116 of the processing circuitry 106 performs the second noise filtering on the sonar data to reduce noise in the sonar data and outputs the second filtered sonar data. The second noise filtering is based on the second threshold different from the first threshold.

At S27, the selector 120 of the processing circuitry 106 selects one of the first filtered sonar data and the second filtered sonar data as output based on the binary mask. When the binary mask indicates absence of target, the selector 120 may select the first filtered sonar data and when the binary mask indicates presence of target, the selector may select the second filtered sonar data as the output.

Although the embodiments of the present disclosure have been described above, the present disclosure is not limited to the embodiments described above, and various modifications can be made by those skilled in the art.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated" and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A sonar device, comprising:
reception circuitry configured to acquire sonar data from one or more targets in an underwater environment; and
processing circuitry comprising:
a target detector configured to generate a binary mask that indicates presence or absence of target based on the sonar data;
a first noise filter configured to receive the sonar data, perform first noise filtering on the sonar data to reduce noise in the sonar data, and output first filtered sonar data, the first noise filtering being based on a first threshold;
a second noise filter configured to receive the sonar data, perform second noise filtering on the sonar data to reduce noise in the sonar data, and output second filtered sonar data, the second noise filtering being based on a second threshold different from the first threshold; and
a selector configured to receive the first filtered sonar data and the second filtered sonar data and select one of the first filtered sonar data and the second filtered sonar data as output based on the binary mask.

2. The sonar device of claim 1, wherein:
the first threshold and the second threshold are greater than a background noise level of the sonar data and the first threshold is greater than the second threshold.

3. The sonar device of claim 2, wherein the selector is configured to:
select the first filtered sonar data as output when the binary mask indicates the absence of target; and
select the second filtered sonar data as output when the binary mask indicates the presence of target.

4. The sonar device of claim 1, wherein the target detector is further configured to:
expand a position marked as presence of target in the binary mask in one or more dimensions.

5. The sonar device of claim 1, wherein the target detector is configured to generate the binary mask by binarization of the first filtered sonar data.

6. The sonar device of claim 1, wherein the processing circuitry further comprises:
a third noise filter configured to receive the sonar data, perform third noise filtering on the sonar data to reduce noise in the sonar data, and output third filtered sonar data, the third noise filtering being based on a third threshold different from the first threshold and the second threshold, wherein the target detector is configured to generate the binary mask by binarization of the third filtered sonar data.

7. The sonar device of claim 6, wherein the first threshold, the second threshold and the third threshold are greater than a background noise level of the sonar data, the first threshold is greater than the second threshold, and the third threshold is greater than the second threshold, wherein the selector is configured to:
select the first filtered sonar data as output when the binary mask indicates the absence of target; and
select the second filtered sonar data as output when the binary mask indicates the presence of target.

8. The sonar device of claim 1, wherein:
the reception circuitry is configured to acquire the sonar data from at least one reception beam; and
the sonar data are extending in at least one dimension corresponding to a distance from the sonar device.

9. The sonar device of claim 1, wherein:
the reception circuitry is configured to acquire the sonar data from a plurality of reception beams for each ping; and
the sonar data are at least two-dimensional data, a first dimension of the at least two-dimensional data corresponding to the plurality of reception beams and a second dimension of the at least two-dimensional data corresponding to a distance from the sonar device.

10. A sonar method, comprising:
acquiring sonar data from one or more targets in an underwater environment;
generating a binary mask that indicates presence or absence of target based on the sonar data;
performing first noise filtering on the sonar data to reduce noise in the sonar data and outputting first filtered sonar data, the first noise filtering being based on a first threshold;
performing second noise filtering on the sonar data to reduce noise in the sonar data and outputting second filtered sonar data, the second noise filtering being based on a second threshold different from the first threshold; and
selecting one of the first filtered sonar data and the second filtered sonar data as output based on the binary mask.

11. The sonar method of claim 10, wherein
the first threshold and the second threshold are greater than a background noise level of the sonar data and the first threshold is greater than the second threshold.

12. The sonar method of claim 11, further comprising:
selecting the first filtered sonar data as output when the binary mask indicates the absence of target; and
selecting the second filtered sonar data as output when the binary mask indicates the presence of target.

13. The sonar method of claim 10, further comprising:
expanding a position marked as presence of target in the binary mask in one or more dimensions.

14. The sonar method of claim 10, further comprising:
generating the binary mask by binarization of the first filtered sonar data.

15. The sonar method of claim 10, further comprising:
performing third noise filtering on the sonar data to reduce noise in the sonar data and output third filtered sonar data, the third noise filtering being based on a third threshold different from the first threshold and the second threshold; and
generating the binary mask by binarization of the third filtered sonar data.

16. The sonar method of claim 15, wherein:
the first threshold, the second threshold, and the third threshold are greater than a background noise level of the sonar data, and
the first threshold and the third threshold are greater than the second threshold; the method further comprising:
selecting the first filtered sonar data as output when the binary mask indicates the absence of target; and
selecting the second filtered sonar data as output when the binary mask indicates the presence of target.

17. The sonar method of claim 10, further comprising:
acquiring the sonar data from at least one reception beam of a sonar device, wherein
the sonar data are extending in at least one dimension corresponding to a distance from the sonar device.

18. The sonar method of claim 10, further comprising:
acquiring the sonar data from a plurality of reception beams of a sonar device for each ping, wherein
the sonar data are at least two-dimensional data, a first dimension of the at least two-dimensional data corresponding to the plurality of reception beams and a second dimension of the at least two-dimensional data corresponding to a distance from the sonar device.

19. A non-transitory computer-readable storage medium having stored thereon machine-readable instructions which, when executed by one or more processors of an apparatus, cause the apparatus to perform a method comprising:
acquiring sonar data from one or more targets in an underwater environment;
generating a binary mask that indicates presence or absence of target based on the sonar data;
performing first noise filtering on the sonar data to reduce noise in the sonar data and outputting first filtered sonar data, the first noise filtering being based on a first threshold;
performing second noise filtering on the sonar data to reduce noise in the sonar data and outputting second filtered sonar data, the second noise filtering being based on a second threshold different from the first threshold; and
selecting one of the first filtered sonar data and the second filtered sonar data as output based on the binary mask.

* * * * *